United States Patent [19]

Andre et al.

[11] 3,993,589

[45] Nov. 23, 1976

[54] PREPARATION OF SPHEROIDAL SILICO-ALUMINA PARTICLES

[75] Inventors: Jacques Maurice Jules Ghislain André; Raymond Marc Cahen, both of Brussels; Henri Robert Debus, Meise; Rene Odon Lammers, Brussels; Hugo Johannes Van Thillo, Grimbergen, all of Belgium

[73] Assignee: Labofina S.A., Brussels, Belgium

[22] Filed: Feb. 10, 1975

[21] Appl. No.: 548,185

[30] Foreign Application Priority Data

Feb. 18, 1974   Luxembourg ........................ 69404

[52] U.S. Cl. ........................ 252/429 R; 252/430; 252/439; 252/442; 252/448; 252/455 R
[51] Int. Cl.² ........................................ B01J 37/00
[58] Field of Search ............... 252/448, 455 R, 430, 252/439, 442, 429 R

[56] References Cited
UNITED STATES PATENTS

| | | |
|---|---|---|
| 2,526,907 | 10/1950 | Schmerling .................... 252/448 X |
| 2,966,466 | 12/1960 | Schwartz ....................... 252/448 X |
| 3,472,791 | 10/1969 | Vesely .......................... 252/455 R X |
| 3,746,657 | 7/1973 | Miller et al. .................... 252/439 X |
| 3,776,987 | 12/1973 | Grimes et al. .................. 252/448 X |

Primary Examiner—Patrick P. Garvin

[57] ABSTRACT

A process for preparing spheroidal silica-alumina particles containing alumina in an amount at least equal to that of silica, comprising dispersing as droplets into a hot and practically water-immiscible fluid, an aqueous mixture comprising an alkali silicate, alumina hydrogel, perchloric acid and a water-soluble monomer whose uncross-linked polymer is water-soluble or forms a gel, alkali silicate and alumina hydrogel being used in proportions corresponding to 0.5 to 50% by weight of $SiO_2$ and 99.5 to 50% by weight of $Al_2O_3$, and maintaining the droplets of the mixture in the fluid until a substantial polymerization of the monomer occurs.

10 Claims, No Drawings

PREPARATION OF SPHEROIDAL SILICO-ALUMINA PARTICLES

BACKGROUND OF THE INVENTION

The present invention relates to a process for preparing spheroidal silica-alumina particles.

The metallic oxides and particularly the mixtures of aluminium oxide and silicium oxide or silica-alumina, are widely used in the chemical industry. For the most of these applications, it is preferable to use the silica-alumina in the form of spheroidal particles or beads. Among the main advantages of these beads are better wear and crushing strength. Also, these beads may be more evenly distributed throughout the reactors in which they are placed thereby reducing the pressure drop through such reactors.

In order to obtain metallic oxide beads of uniform sizes, a hydrosol of the particular oxide generally is introduced as droplets into a hot and practically water-immiscible fluid, acting as a gelitination medium. The application of such a method to produce silica-alumina beads presents some disadvantages. Indeed, even if an alumina hydrosol is used as the alumina source, the gelitination time of the silica-alumina mixture dispersed as droplets is particularly long and does not permit the beads to be produced in a commercially feasible time for industrial applications. To remedy this disadvantage, a gelitination agent must be used, particularly a weak base. Additionally, the beads obtained generally must be immediately subjected to an aging treatment. When compounds other than hydrosols are used as the alumina source, the addition of a gelitizing agent generally gives mixtures which prematurely stiffen and which cannot be dispersed as droplets into the gelitizing medium.

An object of the present invention is to provide a new method for preparing silica-alumina beads.

Another object of the present invention is to provide a method for producing silica-alumina beads from alumina hydrogel.

A further object of the present invention is to provide a method for producing silica-alumina beads by the method of dispersion into a hot fluid, whereby the wet beads obtained are handleable and stable.

A still further object of the present invention is to provide a direct method for producing silica-alumina beads which, after drying and calcining, have a high mechanical strength and which can be used as catalysts or catalyst supports.

Additional objects will become apparent from the following description of the invention herein disclosed.

SUMMARY OF THE INVENTION

The present invention is a process for producing silica-alumina beads containing silica alumina which comprises polymerizing, in a hot and practically water-immiscible fluid, an aqueous mixture containing alumina hydrogel, an alkali-silicate, perchloric acid and a water-soluble monomer whose uncross-linked polymer is water-soluble or forms a gel, this mixture being dispersed as droplets into the hot fluid in which a substantial polymerization of the monomer occurs.

More particularly, the present invention is a process comprising the steps of (a) producing an aqueous mixture containing alumina hydrogel, alkali silicate, perchloric acid and a water soluble monomer whose uncross-linked polymer is water soluble or forms a gel, (b) dispersing, as droplets, said aqueous mixture into a hot and substantially water-immiscible fluid, under substantial polymerization conditions of the monomer contained in each droplet of said aqueous mixture, (c) recovering beads consisting of alumina hydrogel and silica gel agglomerated by the polymer, and (d) drying and calcining said beads to obtain silica-alumina beads containing silica and at least an equal amount of alumina.

DESCRIPTION OF THE PREFERRED EMBODIMENTS

A preferred embodiment of the present invention is a process comprising (a) preparing an aqueous mixture containing from 5 to 30% by weight (based on metallic oxides) of alumina hydrogel and alkali silicate, perchloric acid in an amount corresponding to about 75 to 200% by weight of silica, 0.25 to 20% by weight of a water-soluble monomer, ethylenically unsaturated, whose uncross-linked polymer is water-soluble or forms a gel, and 0.05 to 2% by weight of a polymerization catalyst, (b) dispersing said aqueous mixture as droplets into a water-immiscible fluid having a temperature of 50 to 105° C at atmospheric pressure, (c) maintaining the droplets in this fluid until the beads formed become hard, and (d) recovering, drying and calcining said beads.

According to another embodiment of the process of the invention, it is advantageous to add alkali silicate to perchloric acid in order to form a silicasol. Thereafter dried alumina hydrogel is incorporated in a finely divided from into this silicasol.

The alumina hydrogel may be prepared according to any known method. A particularly useful method is by treating aluminium sulphate with a base, or by hydrolizing isopropylate or another aluminium alcoholate. Also, the alumina hydrogel may be prepared by treating an alkali aluminate with an acid or with aluminium sulphate. The precipitate obtained is waterwashed several times and then dried.

The amount of perchloric acid used in the present process corresponds to about 75 to 200% of the weight of silica used in the alkali silicate form. Generally, this amount is between about 80 and 175% of the silica weight. It has been found that the perchloric acid may be replaced in an amount up to 50% by a halogenated acid, an aliphatic mono or dicarboxylic acid, substituted or unsubstituted, phosphoric acid, or nitric acid. Among these acids, hydrochloric acid generally is used for economic reasons, but formic acid, acetic acid, trichloracetic acid, oxalic acid and other similar acids also may be used.

The respective amounts of alumina hydrogel and alkali silicate in the starting aqueous mixture may vary within wide limits. However, in order to obtain silica-alumina beads which remain stable during calcination and which have the desired crushing strength properties, alumina hydrogel and alkali silicate are used in such proportions that the silica-alumina beads obtained contain 0.5 to 50% by weight of silica and 99.5 to 50% by weight of alumina.

The starting aqueous mixture must remain sufficiently free flowing at room temperature to permit easy dispersion in the form of droplets into the polymerization medium. In order to avoid any excessive investment and drying costs for the beads obtained by the process, highly diluted solutions of the starting mixture are to be avoided. Preferably, aqueous mixtures containing from 5 to 30% by weight (based on metallic oxides) of alumina hydrogel and alkali silicate are used, high proportions being used when the alumina hydrogel: alkali silicate ratio is high. More particularly, the aqueous mixtures used contain about 5 to 15% by weight of alumina hydrogel and alkali silicate.

The water-soluble monomer whose uncross-linked polymer is water-soluble or forms a gel is selected from the group consisting of ethylenically unsaturated compounds comprising acrylic compounds of general formula

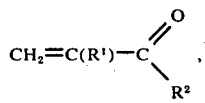

wherein $R^1$ is H or a methyl radical and $R^2$ is a —$OR^3$ or —$NR^3R^4$ radical, with $R^3$ and $R^4$ in such radicals being H or a hydrophilic radical, particularly a hydroxyalkyl radical containing from 1 to 2 carbon atoms or a methoxy methyl radical. Non-limiting examples of such compounds are acrylic acid, methacrylic acid, acrylamide, methacrylamide, N-hydroxy-methylacrylamide, N-hydroxymethylmethacrylamide, N-methoxymethylacrylamide, N-methoxymethylmethacrylamide, ethyleneglycol monoacrylate, ethyleneglycol monomethacrylate, and the like. The choice of the monomer depends mainly on economic conditions, and, for that reason, acrylic acid, methacrylic acid, acrylamide and mixtures thereof preferably are used. Reference to water-soluble monomer and water-soluble uncross-linked polymer also shall include mixtures of ethylenically unsaturated monomers containing a greater part of monomers whose uncross-linked polymers are water-soluble and a lesser part of monomers whose uncross-linked polymers are water-insoluble.

The amount of said water-soluble monomer used depends on many factors such as the amount of alumina hydrogel and alkali silicate, monomer types, desired apparent density for the calcined final beads, etc. Generally the amount of said monomer is between 0.25 and 20% by weight of the aqueous mixture. It has been observed that the behavior of the beads obtained according to the process of the present invention depends on the respective amounts of alumina hydrogel and alkali silicate, on the one hand, and on the monomers used, on the other hand. Preferably, the amount of monomer used is an amount corresponding to about 5 to 150% of the weight of alumina hydrogel and alkali silicate (based on oxides). Higher amounts of monomers may induce a disaggregation when these latter are subjected to calcination. Too low amounts of monomer result in the production of beads which are not easily handled and not very firm. In order to obtain beads which after calcination present interesting properties with regard to density and mechanical strength, the aqueous mixtures preferably used contain an amount of monomer corresponding to about 5 to 75% by weight of the weight of alumina hydrogel and alkali silicate (based on oxides) used.

The starting mixture is dispersed into a substantially water-immiscible fluid, having a temperature between about 50 and 105° C at atmospheric pressure. Preferably, the aqueous mixture is introduced with the aid of calibrated orifices or nozzles in order to obtain a subdivision of said mixture in the form of droplets which are dispersed into the fluid. The residence time of the droplets in the fluid must be sufficient to permit the polymerization of the monomers. This water-immiscible fluid, may be a gas, such as dry air, which is introduced into a tower in counter-current flow to the droplets of the starting aqueous mixture. Another advantageous embodiment of the invention is the using, as the fluid, a water-immiscible liquid. This liquid may have a density higher than that of the beads to be prepared. In such instance, the starting aqueous mixture is introduced as droplets at the bottom of a column containing the liquid and the beads formed are then recovered on the surface of the liquid. Another embodiment consists in using a liquid medium whose density is lower than that of the beads such as a mineral oil. A generally used such technique is described in U.S. Pat. No. 2,620,314. Such technique consists in using a column filled with hot oil in which droplets of the aqueous mixture are let to fall, the residence time of the droplets in the oil being sufficient to allow the polymerization of the polymer. Temperature of such liquid is at least equal to about 50° C in order to reduce the polymerization time. Temperatures higher than about 105°–110° C result in evaporation of water and a disaggregation of beads, unless the process is carried out under pressure. According to a preferred embodiment, the temperature of the water-immiscible liquid is between 75° and 100° C and the pressure at about atmospheric pressure.

In order to reduce the time needed for the beads to form, it is advantageous to use means for promoting the polymerization of the monomers. Free radical catalysis techniques with peroxidic compounds are quite useful, and particularly useful are the redox catalyst system which consists in using as catalyst a combination of a peroxidic compound and a reducing agent. Hydrogen peroxide, persulpuric acid, perboric acid and their salts, particularly sodium, potassium or ammonium persulphates and the water-soluble peracids, such as peracetic acid, are examples of useful peroxidic compounds. Reducing agents may be selected from the group consisting of sodium thiosulphate, sodium hyposulphite or dithionite, sodium or potassium bisulfite, N, N, N', N'tetramethylethylenediamine, sodium formaldehydro-sulfoxylate, hydrazine, ascorbic acid, etc. A part of the reducing agent may be introduced into the starting aqueous mixture, the other part being added into the water-immiscible fluid in which the polymerization is performed, to the extent such reducing agent is soluble in the fluid. It may also be added into the vessel in which the beads are recovered.

The term polymerization catalyst as used herein, includes the peroxidic compound when this latter is used with or without reducing agent. The amount of polymerization catalyst can vary widely and it depends on the content of inhibitors present in the monomers used. Generally, the amount of polymerization catalyst is between about 0.05 and 2% by weight of aqueous mixture when the monomers are substantially free of inhibitors.

The mixture subjected to polymerization may contain a cross-linking agent which has functional groups so that the polymer chains are linked together and form a three dimensional structure. Cross-linking agents may be 1,3-di (acryl- or methacryl-amidomethyl)-2-imidazolidone, hexahydrotriacryloyltriazine, N,N'-methylidine-bis-acrylamide and alkylidene-bis-acrylamides, such as N,N'-methylene-bis-acrylamide and N,N'-ethylidene-bis-acrylamide, or when the acrylic monomer used has an amide group, an aldehydic compound may be used as cross-linking agent, such as formaldehyde and glyoxal. Glyoxal reacts with a part of acrylamide to form N,N'-dihydroxyethylene-bis-acrylamide. It is not necessary to add a cross-linking agent when the acrylic monomers are in an acid medium, but it may be useful to reduce attrition of the beads formed. The amount of cross-linking agent does not generally exceed 1% of the weight of the aqueous mixture. Larger amounts may be used, however, but without any significant advantage.

The beads obtained after polymerization of the monomer are manipulable and stable. They can be stored before or after waterwashing. The beads are subjected to a thermal treatment, particularly a drying treatment at a temperature of 110°–120° C, and then to a calcination step which generally is performed by progressively increasing the temperature up to about 400° to 800° C, preferably 500° to 700° C. During this calcination the organic matter contained in the beads is destroyed and silica-alumina beads are obtained.

When the silica-alumina beads are used as catalyst supports, they are impregnated, by any known method, with solutions of compounds which generate active catalytic agents. Impregnation may be carried out on undried beads or dried beads or on dried and calcined beads. When undried beads are impregnated, the above discussed thermal treatment also acts to convert the compounds which generate catalytic agents into active catalytic agents. If dried or dried and calcined beads are impregnated, a new thermal treatment is required to activate the active catalytic agents. The catalysts so made with the herein disclosed silica-alumina supports generally are active catalytic agents in a metallic compound state (metallic oxides or sulphides) or in a metal state, and they are primarily used in processes for the treatment of hydrocarbons. In such instances, the silica-alumina beads prepared according to the process of the invention are impregnated before drying or after drying or after calcination, with a solution of compounds containing a Group VIII and/or a Group VI B metal. For instance, if the beads are impregnated with a nickel nitrate aqueous solution, a catalyst is obtained after calcination consisting of nickel oxide on a silica-alumina support. If the beads are impregnated with an ammonium molybdate solution, the calcined catalyst consists of molybdenum oxide on a silica-alumina support.

The following examples are presented for the purpose of illustrating the present invention and are not to be considered as limiting. Except where otherwise stated, all percentages are expressed by weight. In the following examples, the mechanical resistance of the beads is expressed by the crushing resistance measured with the Tablet Hardness Tester apparatus (of Manestry Machines Ltd., Liverpool, Great Britain), in which the bead is placed between two plates, one of which is fixed and the other moves for increasing weight on the beads. The values given in the following examples are the average values of experiments performed on 5 beads.

EXAMPLE 1

An aqueous mixture was prepared containing the following:

| | |
|---|---|
| alumina hydrogel | : 8% (based on $Al_2O_3$) |
|سodium silicate | : 2% (based on $SiO_2$) |
| perchloric acid | : 3.9% |
| acrylic acid | : 2% |
| dihydroxyethylene-bis-acrylamide | : 0.1% |
| ammonium persulphate | : 0.33% |
| sodium bisulphite | : 0.033% |

Alumina hydrogel was prepared by treating aluminium sulphate with caustic soda up to pH = 9. The gel obtained was purified by several water-washes and thereafter dried at 110° C, crushed and sieved. Sodium silicate was added drop-wise to water and perchloric acid. Thereafter the dried alumina hydrogel and other constituents of the aqueous mixture were added. The resulting mixture was injected drop-wise into a column containing a paraffinic oil (density $d_{15}^4$ : 0.83) heated at 95° C. The beads were recovered at the bottom of the column. They were stable and manipulatable. After water-washing, drying at 120° and a slow calcination up to 700° C, the beads obtained had a crushing strength of 5.4 kg.

EXAMPLE 2

An aqueous mixture was prepared containing the following:

| | |
|---|---|
| alumina hydrogel | : 5% (based on $Al_2O_3$) |
| potassium silicate | : 1.7% (based on $SiO_2$) |
| perchloric acid | : 3.4% |
| methacrylic acid | : 2.2% |
| ethyleneglycol methacrylate | : 0.3% |
| N,N'-ethylene-bis-acrylamide | : 0.10% |
| Ammonium persulphate | : 0.3% |
| potassium bisulphite | : 0.03% |

This mixture was injected drop-wise at the bottom of a column containing Phenoclor DP4 (chlorinated diphenyl sold by PROGIL S. A. and having a density of 1.39 at 100° C) heated at 95° C. The beads were recovered at the surface of the column. They were washed, dried at 110° and calcined at 700° C and found to have a crushing strength of 4.9 kg.

EXAMPLE 3

An aqueous mixture was prepared containing the following:

| | |
|---|---|
| alumina hydrogel | : 6.5% (based on $Al_2O_3$) |
| sodium silicate | : 3.5% (based on $SiO_2$) |
| perchloric acid | : 4.9% |
| acrylic acid | : 2% |
| acrylamide | : 0.1% |
| glyoxal | : 0.08% |
| ammonium persulphate | : 0.33% |
| sodium bisulphite | : 0.033% |

The procedure described in Example 1 was repeated. The beads obtained after calcination had a crushing strength of 3 ig.

EXAMPLE 4

An aqueous mixture was prepared containing the following:

| | |
|---|---|
| alumina hydrogel | : 5% (based on $Al_2O_3$) |
| sodium silicate | : 5% (based on $SiO_2$) |
| perchloric acid | : 6% |

-continued

| | |
|---|---|
| acrylic acid | : 2% |
| dihydroxyethylene-bis-acrylamide | : 0.1% |
| ammonium persulphate | : 0.27% |
| sodium bisulphite | : 0.027% |

The procedure described in Example 1 was repeated. The beads recovered were maintained in oil heated at 95° C for 2 hours. Thereafter, they were water-washed, dried at 110° C and calcined. They had a crushing strength of 4.4 kg.

EXAMPLE 5

Silica-alumina beads were prepared as described in Example 1, from a starting aqueous mixture containing:

| | |
|---|---|
| alumina hydrogel | : 22.4% (based on $Al_2O_3$) |
| sodium silicate | : 0.8% (based on $SiO_2$) |
| perchloric acid | : 1.6% |
| acrylic acid | : 4% |
| acrylonitrile | : 1% |
| dihydroxyethylene-bis-acrylamide | : 0.25% |
| ammonium persulphate | : 1.2% |
| sodium bisulphite | : 0.12% |

The recovered beads were water-washed, dried at 110° C and calcined at 700° C. Such beads had a crushing strength of 8.1 kg.

EXAMPLE 6

The procedure described in Example 1 was repeated with an aqueous mixture containing:

| | |
|---|---|
| alumina hydrogel | : 18% (based on $Al_2O_3$) |
| sodium silicate | : 2% (based on $SiO_2$) |
| acrylic acid | : 17% |
| perchloric acid | : 3.6% |
| dihydroxyethylene-bis-acrylamide | : 0.85% |
| ammonium persulphate | : 0.9% |
| sodium bisulphite | : 0.09% |

The recovered beads had, after calcination, an apparent density of 0.82 g/ml and a crushing strength of 6.4 kg.

What is claimed is:

1. A process for preparing spheroidal silico-alumina particles containing alumina in an amount at least equal to that of silica, comprising dispersing as droplets into a hot and practically water-immiscible fluid, an aqueous mixture comprising an alkali silicate, finely divided alumina hydrogel, perchloric acid in an amount equal to 75 to 200% of the weight of silica in alkali silicate form, and 0.25 to 20% by weight of a water soluble monomer whose uncross-linked polymer is water-soluble or forms a gel, said monomer being an acrylic compound of general formula

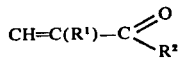

wherein $R^1$ is selected from the group consisting of H and the methyl radical, $R^2$ is selected from the group consisting of the $-OR^3$ and $-NR^3R^4$ radicals and wherein $R^3$ and $R^4$ are selected from the group consisting of H and a hydrophilic radical, alkali silicate and alumina hydrogel being used in proportions corresponding to 0.5 to 50% by weight of $SiO_2$ and 99.5 to 50% by weight of $Al_2O_3$, and maintaining the droplets of the mixture in the fluid under thermal polymerization conditions or in the presence of a free radical polymerization catalyst until a substantial polymerization of the monomer occurs.

2. A process for preparing spheroidal silica-alumina particles comprising preparing an aqueous mixture comprising alumina hydrogel as an aluminium oxide precursor, an alkali silicate as silicium oxide precursor, perchloric acid in an amount corresponding to about 75 to 200% of said alkali silicate weight (based on $SiO_2$) and 0.25 to 20% by weight of a water-soluble monomer whose uncross-linked polymer is water-soluble or forms a gel, said monomer comprising an acrylic compound of general formula

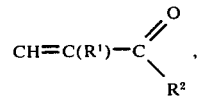

wherein $R^1$ is selected from the group consisting of H and the methyl radical, $R^2$ is selected from the group consisting of the $-OR^3$ and $-NR^3R^4$ radicals and wherein $R^3$ and $R^4$ are selected from the group consisting of H and a hydrophilic radical, said alumina hydrogel (based on $Al_2O_3$) being used in an amount at least equal to that of the alkali silicate (based on $SiO_2$), dispersing said mixture as droplets in a hot and practically water-immiscible fluid under thermal polymerization conditions or free radical catalyst polymerization conditions until substantial polymerization of the monomer contained in each droplet of aqueous mixture, recovering beads comprising the aluminium oxide precursor and silicium oxide precursor, agglomerated by the polymer, drying and calcining said beads.

3. The process of claim 2 wherein said aqueous mixture comprises about 5 to 30% by weight (based on metallic oxides) of said alumina hydrogel and alkali silicate, said perchloric acid in an amount corresponding to about 75 to 200% of said alkali silicate weight (based on $SiO_2$), about 0.25 to 20% by weight of said water-soluble monomer, ethylenically unsaturated, whose uncross-linked polymer is water-soluble or forms a gel and about 0.05 to 2% by weight of a free radical polymerization catalyst.

4. The process of claim 1 wherein said monomer is used in an amount corresponding to about 5 to 150% of the weight of said alumina hydrogel and alkali silicate, based on metallic oxides.

5. The process of claim 1 wherein a cross-linking agent which can react with an acrylic monomer is used in conjunction with said monomer.

6. The process of claim 1 wherein said aqueous mixture contains alumina hydrogel and alkali silicate in such proportion that the silica-alumina obtained contains from 0.5 to 50% by weight of silica and 99.5% to 50% by weight of alumina.

7. The process of claim 1 wherein perchloric acid is used as a mixture containing perchloric acid and up to an equal amount of an acid selected from the group consisting of hydrochloric acid, formic acid, acetic acid, trichloro acetic acid, oxalic acid, phosphoric acid, and nitric acid.

8. The process of claim 1 wherein the polymerization of said aqueous mixture is performed by dispersing said aqueous mixture as droplets and by passing these droplets into counter-current contact with a hot dry gas.

9. The process of claim 1 wherein the polymerization of said aqueous mixture is performed by dispersing said aqueous mixture as droplets at the bottom of a column containing a liquid having a density higher than that of the beads, and recovering the beads at the upper surface of the liquid.

10. The process of claim 1 wherein the polymerization of said aqueous mixture is performed by dispersing said aqueous mixture as droplets at the head of a column containing a liquid having a density lower than that of the beads, and recovering said beads at the bottom of the column.

* * * * *